United States Patent
Shimamura et al.

(10) Patent No.: US 8,361,658 B2
(45) Date of Patent: Jan. 29, 2013

(54) CATHODE MATERIAL AND NON-AQUEOUS ELECTROLYTE SECONDARY BATTERY USING IT

(75) Inventors: Harunari Shimamura, Moriguchi (JP); Toshitada Sato, Osaka (JP); Takayuki Nakamoto, Sakai (JP); Yasuhiko Bito, Osaka (JP); Yoshiaki Nitta, Hirakata (JP)

(73) Assignee: Panasonic Corporation, Osaka (JP)

( * ) Notice: Subject to any disclaimer, the term of this patent is extended or adjusted under 35 U.S.C. 154(b) by 232 days.

(21) Appl. No.: 12/775,185

(22) Filed: May 6, 2010

(65) Prior Publication Data

US 2010/0216033 A1    Aug. 26, 2010

Related U.S. Application Data (62) Division of application No. 10/508,341, filed as application No. PCT/JP03/03190 on Mar. 17, 2003, now Pat. No. 7,736,806.

(30) Foreign Application Priority Data

Mar. 20, 2002 (JP) ................... 2002-079128

(51) Int. Cl.
*H01M 4/38* (2006.01)
*H01M 10/40* (2006.01)
*H01M 4/58* (2010.01)

(52) U.S. Cl. .................. 429/231.5; 429/229; 429/324

(58) Field of Classification Search .................. None
See application file for complete search history.

(56) References Cited

U.S. PATENT DOCUMENTS

| | | | |
|---|---|---|---|
| 6,090,505 A | 7/2000 | Shimamura et al. | |
| 6,541,156 B1 | 4/2003 | Fuse et al. | |
| 6,653,019 B1 | 11/2003 | Shimamura et al. | |
| 6,821,675 B1 | 11/2004 | Morigaki et al. | |
| 6,824,920 B1 | 11/2004 | Iwamoto et al. | |
| 6,911,282 B2 * | 6/2005 | Kasamatsu et al. | 429/218.1 |
| 2003/0039891 A1 | 2/2003 | Nitta et al. | |
| 2003/0096168 A1 * | 5/2003 | Kasamatsu et al. | 429/231.95 |

FOREIGN PATENT DOCUMENTS

| | | |
|---|---|---|
| EP | 1 028 476 A | 8/2000 |
| EP | 1 102 339 A | 5/2001 |
| EP | 1 109 239 A1 | 6/2001 |
| EP | 1 396 894 A | 3/2004 |
| JP | 07-240201 | 9/1995 |
| JP | 09-063651 | 3/1997 |
| JP | 2000-030703 | 1/2000 |
| JP | 2001-006677 | 1/2001 |
| JP | 2001-243946 | 9/2001 |
| JP | 2001-291512 | 10/2001 |
| JP | 2002-050353 | 2/2002 |

OTHER PUBLICATIONS

European Search Report issued in European Patent Application No. EP 03708654.3 dated Feb. 2, 2010.

* cited by examiner

*Primary Examiner* — John S Maples
(74) *Attorney, Agent, or Firm* — McDermott Will & Emery LLP (57) ABSTRACT

A negative electrode material for non-aqueous electrolyte secondary batteries, characterized in that the negative electrode material comprises a composite particle including solid phases A and B, the solid phase A being dispersed in the solid phase B, and the ratio ($I_A/I_B$) of the maximum diffracted X-ray intensity ($I_A$) attributed to the solid phase A to the maximum diffracted X-ray intensity ($I_B$) attributed to the solid phase B satisfies $0.001 \leq I_A/I_B \leq 0.1$, in terms of a diffraction line obtained by a wide-angle X-ray diffraction measurement of the composite particle.

4 Claims, 1 Drawing Sheet

CATHODE MATERIAL AND NON-AQUEOUS ELECTROLYTE SECONDARY BATTERY USING IT

RELATED APPLICATIONS

This application is a Divisional of U.S. application Ser. No. 10/508,341, filed on Sep. 20, 2004, now U.S. Pat. No. 7,736,806, which is the U.S. National Phase under 35 U.S.C.§371 of International Application No. PCT/JP2003/03190, filed on Mar. 17, 2003, claiming priority of Japanese Patent Application No. 2002-079128, filed on Mar. 20, 2002, the entire contents of each of which are hereby incorporated by reference.

TECHNICAL FIELD

The present invention relates to a non-aqueous electrolyte secondary battery to be used for portable information terminals, portable electric appliances, home use compact power storage devices, automatic two-wheeled vehicles having motors as power sources, electric cars, hybrid electric automobiles and the like. More specifically, the present invention relates to a negative electrode material for non-aqueous electrolyte secondary batteries.

BACKGROUND ART

Lithium secondary batteries, which have recently been utilized as main power supplies of mobile communication devices and potable electric appliances, are characterized by having high electromotive force and a high energy density.

Lithium secondary batteries in which lithium metal is used as a negative electrode material has a high energy density, but dendrite deposits on a negative electrode during charging. As charge/discharge are repeated, the dendrite develops to penetrate a separator and comes into contact with a positive electrode, causing an internal short circuit. Further, as having a large surface area, the deposited dendrite has a high reactivity and reacts, on the surface thereof, with a solvent in an electrolyte to form a solid-electrolytic interface layer having poor electronic conductivity. This leads to higher internal resistance within the battery and to the existence of particles isolated from the electronically conductive network. For these reasons, a charge/discharge efficiency decreases.

Lithium secondary batteries in which lithium metal is used as a negative electrode material therefore have problems of low reliability and short cycle life.

As an alternative negative electrode material for lithium metal currently used has been a carbon material capable of absorbing and desorbing lithium ions, and batteries using this for the negative electrode thereof have come into practical use. There normally occurs no problem of an internal short circuit due to dendrite in a negative electrode using a carbon material since metallic lithium does not deposit thereon. However, the theoretical capacity of graphite, one of carbon materials, is 372 mAh/g, which is as small as about one tenth of the theoretical capacity of Li metal.

As other negative electrode materials known is a elemental metallic or non-metallic material, which form a compound with lithium. In the case of silicon, tin and zinc, for example, the compositions of the respective compounds with the largest content of lithium are $Li_{22}Si_5$, $Li_{22}Sn_5$ and $LiZn$. With lithium contained in this degree in each of the compounds, metallic lithium usually does not deposit, to cause no problem of the internal short circuit due to dendrite. Electrochemical capacities obtained by the change from elemental substances to these compounds are, respectively, 4199 mAh/g, 993 mAh/g and 410 mAh/g, which are all larger than the theoretical capacity of graphite.

As a negative electrode material using a different compound from those described above, Japanese Laid-Open Patent Publication No. Hei 7-240201 proposes a silicate of non-iron metal including a transition element. Further, Japanese Laid-Open Patent Publication No. Hei 9-63651 proposes a compound which comprises an intermetallic compound containing the Group 4B elements, and at least one of P and Sb, and whose crystal structure is any of $CaF_2$ type, ZnS type and AlLiSi type.

However, the aforesaid negative electrode materials with higher capacities than those of carbon materials have problems as described below.

Simple substance metals and simple substance non-metals, which form a compound with lithium, have inferior charge/discharge cycle characteristics to carbon materials. The reason for that is presumed as follows.

For example, silicon contains 8 silicon atoms in the crystallographic unit lattice thereof (cubic, space group Fd-3m). From a lattice constant "a"=0.5420 nm determined are a unit lattice volume of 0.1592 $nm^3$ and a volume per one silicon atom of 19.9×$10^{-3}$ $nm^3$. Judging from the phase diagram of the silicon-lithium binary type, it is considered that, when silicon electrochemically reacts with lithium at room temperature to form a compound, two phases, silicon and the compound $Li_{12}Si_7$, coexist in the initial stage of the reaction. $Li_{12}Si_7$ contains 56 silicon atoms in the crystallographic unit lattice thereof (rhombic, space group Pnma). From lattice constants "a"=0.8610 nm, "b"=1.9737 nm and "c"=1.4341 nm, a unit lattice volume of 2.4372 $nm^3$ and a volume per one silicon atom (a value obtained by dividing the unit lattice volume by the number of the silicon atoms in the unit lattice) of 43.5×$10^{-3}$ $nm^3$ are determined. Hence conversion from silicon to the compound $Li_{12}Si_7$ causes an increase in volume by 2.19 times and the material thus expands. When the reaction proceeds in such a state as the two phases, silicon and the compound $Li_{12}Si_7$, coexist, silicon partly converts into the compound $Li_{12}Si_7$ and a large volume difference therebetween causes serious distortion of the material. This material is therefore considered as prone to cracking and pulverizing.

Moreover, as the electrochemical reaction between silicon and lithium advances, the compound $Li_{22}Si_5$ with the largest content of lithium is ultimately obtained. $Li_{22}Si_5$ contains 80 silicon atoms in the crystallographic unit lattice thereof (cubic, space group F23). From a lattice constant "a"=1.875 nm determined are a unit lattice volume of 6.5918 $nm^3$ and a volume per one silicon atom (a value obtained by dividing the unit lattice volume by the number of the silicon atoms in the unit lattice) of 82.4×$10^{-3}$ $nm^3$. Hence conversion from silicon to the compound $Li_{22}Si_5$ causes an increase in volume by 4.14 times, and hence the material expands significantly. In the discharge reaction of the negative electrode material, on the other hand, lithium is gradually reduced from the compound, and the material thus shrinks. It is therefore considered that a major variation in material volume during charging/discharging brings about significant distortion of the material, whereby cracking occurs to pulverize particles.

It is further considered that, as spaces are formed among the pulverized particles to cause segmentation of the electronically conductive network, a portion incapable of being involved in the electrochemical reaction increases to deteriorate the charge/discharge characteristic.

Tin contains 4 tin atoms in the crystallographic unit lattice thereof (tetragonal, space group I41/amd). From lattice constants "a"=0.5820 nm and "c"=0.3175 nm, a unit lattice volume of 0.1075 nm$^3$ and a volume per one tin atom of 26.9× 10$^{-3}$ nm$^3$ are determined. Judging from the phase diagram of the tin-lithium binary type, it is considered that, when tin electrochemically reacts with lithium at room temperature to form a compound, two phases of tin and the compound Li$_2$Sn$_5$ coexist in the initial stage of the reaction. Li$_2$Sn$_5$ contains 10 tin atoms in the crystallographic unit lattice thereof (tetragonal, space group P4/mbm). From lattice constants "a"=1.0274 nm and "c"=0.3125 nm, a unit lattice volume of 0.32986 nm$^3$ and a volume per one tin atom (a value obtained by dividing the unit lattice volume by the number of the tin atoms in the unit lattice) of 33.0×10$^{-3}$ nm$^3$ are determined. Hence conversion from tin to the compound Li$_2$Sn$_5$ causes an increase in volume by 1.23 times and the material thus expands.

Moreover, as the electrochemical reaction between tin and lithium advances, the compound Li$_{22}$Sn$_5$ with the largest content of lithium is ultimately obtained. Li$_{22}$Sn$_5$ contains 80 tin atoms in the crystallographic unit lattice thereof (cubic, space group F23). From a lattice constant "a"=1.978 nm determined are a unit lattice volume of 7.739 nm$^3$ and a volume per one tin atom (a value obtained by dividing the unit lattice volume by the number of the tin atoms in the unit lattice) of 96.7×10$^{-3}$ nm$^3$. Hence conversion from tin to the compound Li$_{22}$Si$_5$ causes an increase in volume by 3.59 times, and hence the material expands significantly.

Zinc contains 2 zinc atoms in the crystallographic unit lattice thereof (hexagonal, space group P63/mmc). From lattice constants "a"=0.2665 nm and "c"=0.4947 nm, a unit lattice volume of 0.030428 nm$^3$ and a volume per one zinc atom of 15.2×10$^{-3}$ nm$^3$ are determined. Judging from the phase diagram of the zinc-lithium binary type, when zinc electrochemically reacts with lithium at room temperature to form several compounds, the compound LiZn with the largest content of lithium is ultimately obtained. LiZn contains 8 zinc atoms in the crystallographic unit lattice thereof (cubic, space group Fd-3m). From lattice constants "a"=0.6209 nm determined are a unit lattice volume of 0.2394 nm$^3$ and a volume per one zinc atom (a value obtained by dividing the unit lattice volume by the number of the zinc atoms in the unit lattice) of 29.9×10$^{-3}$ nm$^3$. Hence conversion from zinc to the compound LiZn causes an increase in volume by 1.97 times and the material thus expands.

In the case of using tin or zinc, as in the case of silicon, therefore, the volume variation in negative electrode material due to the charge/discharge reaction is large and the variation continues in a state where the two phases with great volume differences coexist. This is considered as the cause of cracking of a material and pulverization of the particles thereof. It is further thought that, as spaces are formed among the pulverized particles to cause segmentation of the electronically conductive network, a portion incapable of being involved in the electrochemical reaction increases to deteriorate the charge/discharge characteristic.

That is to say, when a simple substance metal or a simple substance non-metal, which forms a compound with lithium, is used for a negative electrode, the metal or non-metal suffers a large volume variation and tends to be pulverized. This presumably causes the inferior charge/discharge cycle characteristic to a negative electrode using a carbon material.

Other than the aforesaid simple substances, Japanese Laid-Open Patent Publication No. Hei 7-240201 proposes a silicate of non-iron metal including a transition element as a negative electrode material capable of improving the cycle life characteristic. In this publication provided are examples of batteries in which a silicate of non-iron metal including a transition element is used as a negative electrode material and comparative examples of batteries in which lithium metal is used as a negative electrode material, and the charge/discharge cycle characteristics of the respective batteries are compared. It is then disclosed that the charge/discharge characteristics of the batteries in the examples are improved more than those of the batteries in the comparative examples. By comparison with a battery in which natural graphite is used as a negative electrode material, however, the maximum increase in battery capacity in the examples is only about 12%.

Although not definitely stated in the publication, therefore, there appears to be no significant increase in capacity of the battery in which silicate of non-iron metal including a transition metal for the negative electrode thereof is used, as compared with a battery in which graphite is used for the negative electrode thereof.

Further, Japanese Laid-Open Patent Publication No. Hei 9-63651 proposes a compound which comprises an intermetallic compound containing the Group 4B element and at least one of P and Sb, and whose crystal structure is any of CaF$_2$ type, ZnS type and AlLiSi type, as a negative electrode material capable of improving the cycle life characteristic.

It is disclosed that the charge/discharge cycle characteristic is more improved in an example where the aforesaid compound is used for the negative electrode than in a comparative example where Li—Pb alloy is used for the negative electrode. It is further disclosed that a higher capacity is obtained in the example than in a case of using graphite for the negative electrode.

However, the battery in the example exhibits a significant decrease in discharge capacity at 10th to 20th cycles, and even in the case of using Mg$_2$Sn, which is presumably the most favorable compound, the discharge capacity decreases to about 70% of the initial capacity after about 20th cycles.

Furthermore, Japanese Laid-Open Patent Publication No. 2000-30703 proposes a negative electrode material, comprising solid phases A and B, the solid phase A comprising at least one of silicon, tin and zinc as the constituent element thereof, the solid phase B comprising a solid solution or an intermetallic compound, containing one of silicon, tin and zinc as the constituent element of the solid phase A, and at least one element selected from the group consisting of the elements of Group 2, transition, Group 12, Group 13, and Group 14 which are listed in Long Form of Periodic Table, with carbon excluded from Group 14 element. It is disclosed that a battery using this negative electrode material for the negative electrode thereof has a higher capacity and a more improved cycle life characteristic than a battery using graphite for the negative electrode thereof.

When the crystallinity of the solid phase A in this material is high, a problem may arise that stress within particles at the time of absorbing lithium concentrates in one direction to make the particles prone to destruction, leading to a shorter cycle life.

A description is given to crystallinity. In general, the crystal properties are largely classified into amorphousness (in a state where a diffraction line is not obtained in a wide-angle X-ray diffraction measurement), micro-crystalline, poly-crystalline and mono-crystalline. For solving the aforesaid problems required is to lower the crystallinity of the solid phase A. That the solid phase A in a low-crystallinity state here means that the solid phase A is in a mixed state of amorphousness and micro-crystalline. It is to be noted that micro-crystalline means poly-crystalline with a crystal size of not larger than about 150 nm. Further, the crystallinity of the solid phase B may be poly-crystalline or micro-crystalline.

In order to solve the aforesaid problems, an object of the present invention is to provide a negative electrode material capable of suppressing pulverization thereof due to repeated cycles. Another object of the present invention is to provide a non-aqueous electrolyte secondary battery having a high capacity and an excellent cycle life characteristic, by the use of this negative electrode material.

DISCLOSURE OF INVENTION

A negative electrode material for non-aqueous electrolyte secondary batteries in accordance with the present invention is one capable of absorbing and desorbing lithium, characterized in that: the negative electrode material comprises a composite particle including solid phases A and B, the solid phase A being dispersed in the solid phase B; the solid phase A comprises at least one element selected from the group consisting of silicon, tin and zinc; the solid phase B comprises a solid solution or an intermetallic compound, which contains the constituent element of the solid phase A, and at least one element selected from the group consisting of the elements of Group 2, transition, Group 12, Group 13 and Group 14 which are listed in Long Form of Periodic Table, except for the constituent element of the solid phase A and carbon; and the ratio ($I_A/I_B$) of the maximum diffracted X-ray intensity ($I_A$) attributed to the solid phase A to the maximum diffracted X-ray intensity ($I_B$) attributed to the solid phase B satisfies $0.001 \leq I_A/I_B \leq 0.1$, in terms of a diffraction line obtained by a wide-angle X-ray diffraction measurement of the composite particle.

Further, a negative electrode material for non-aqueous electrolyte secondary batteries in accordance with the present invention is one capable of absorbing and desorbing lithium, characterized in that: the negative electrode material comprises a composite particle including solid phases A and B, the solid phase A being dispersed in the solid phase B; the solid phase A comprises at least one element selected from the group consisting of silicon, tin and zinc; the solid phase B comprises a solid solution or an intermetallic compound, which contains the constituent element of the solid phase A, and at least one element selected from the group consisting of the elements of Group 2, transition, Group 12, Group 13 and Group 14 which are listed in Long Form of Periodic Table, except for the constituent element of the solid phase A and carbon; and the half width (W) (radian) of the maximum peak intensity of diffracted X-rays, attributed to the solid phase A, satisfies $0.001 \leq W \leq 0.1$, in terms of a diffraction line obtained by a wide-angle X-ray diffraction measurement of the composite particle.

It is preferable that the solid phase A comprises Si and Sn, and the solid phase B comprises a solid solution or an intermetallic compound, which contains Cu and at least one of Sn and Si.

It is preferable that the solid phase B comprises $CuSi_2$ and $Cu_6Sn_5$.

It is preferable that the solid phase B comprises $CuSi_2$ and a solid solution containing Cu and Sn.

It is preferable that the solid phase B comprises $Cu_6Sn_5$ and a solid solution containing Cu and Si.

It is preferable that the solid phase B comprises a solid solution containing Cu and Si, and a solid solution containing Cu and Sn.

It is preferable that the solid phase A comprises Si and the solid phase B comprises a solid solution or an intermetallic compound, which contains Ti and Si.

It is preferable that the solid phase B comprises $TiSi_2$ having a crystal structure of at least one selected from the group consisting of Cmcm and Fddd.

Further, a non-aqueous electrolyte secondary battery in accordance with the present invention comprises: a positive electrode capable of a reversible electrochemical reaction of lithium, a non-aqueous electrolyte comprising an organic solvent and a lithium salt dissolved in the organic solvent, and a negative electrode comprising the aforesaid negative electrode material.

BEST MODE FOR CARRYING OUT THE INVENTION

A negative electrode material for non-aqueous electrolyte secondary batteries in accordance with the present invention is one capable of absorbing and desorbing lithium, characterized in that: the negative electrode material comprises a composite particle including solid phases A and B, the solid phase A being dispersed in the solid phase B; the solid phase A comprises at least one element selected from the group consisting of silicon, tin and zinc; the solid phase B comprises a solid solution or an intermetallic compound, which contains the constituent element of the solid phase A, and at least one element selected from the group consisting of the elements of Group 2, transition, Group 12, Group 13 and Group 14 which are listed in Long Form of Periodic Table, except for the constituent element of the solid phase A and carbon; and the ratio ($I_A/I_B$) of the maximum diffracted X-ray intensity ($I_A$) attributed to the solid phase A to the maximum diffracted X-ray intensity ($I_B$) attributed to the solid phase B satisfies $0.001 \leq I_A/I_B \leq 0.1$, in terms of a diffraction line obtained by a wide-angle X-ray diffraction measurement of the composite particle.

When $I_A/I_B$ is 0.1 or less, the volume ratio of the crystal of the solid phase A in one particle comprising the solid phase A and the solid phase B is small and thereby, even with lithium absorbed in the solid phase A, stress concentration in one direction is decreased, having the effect of suppressing cracking of particles.

When $I_A/I_B$ exceeds 0.1, however, the volume ratio of the crystal of the solid phase A in one particle increases and thereby, with lithium absorbed in the solid phase A, stress concentration in one direction becomes larger, and it thus becomes difficult to suppress cracking of particles.

When $I_A/I_B$ is less than 0.001, while cracking of particles can be suppressed, such a small volume ratio of the crystal of the solid phase A in one particle causes lowering of the absolute specific volume of the particle, resulting in a decrease in capacity per volume.

Further, the negative electrode material for non-aqueous electrolyte secondary batteries in accordance with the present invention is one capable of absorbing and desorbing lithium, characterized in that: the negative electrode material comprises a composite particle including solid phases A and B, the solid phase A being dispersed in the solid phase B; the solid phase A comprises at least one element selected from the group consisting of silicon, tin and zinc; the solid phase B comprises a solid solution or an intermetallic compound, which contains the constituent element of the solid phase A, and at least one element selected from the group consisting of the elements of Group 2, transition, Group 12, Group 13 and Group 14 which are listed in Long Form of Periodic Table, except for the constituent element of the solid phase A and carbon; and the half width (W) (radian) of the maximum peak intensity of diffracted X-rays, attributed to the solid phase A, satisfies $0.001 \leq W \leq 0.1$, in terms of a diffraction line obtained by a wide-angle X-ray diffraction measurement of the composite particle.

W is a peak width measured at intensity "2θ" which is half as large as the maximum peak intensity of diffracted X-rays, which is attributed to the solid phase A, and represented by a radian unit. It should be noted that "θ" is an incident angle of X-rays.

When W is not larger than 0.1 radian, the crystal size of the solid phase A in one particle comprising the solid phase A and the solid phase B is so small as to raise the plastic limit thereof, over which the solid phase A would fracture, even with lithium absorbed in the solid phase A. This makes the solid phase A resistant to fracture and the particles resistant to crack.

When W exceeds 0.1 radian, however, the crystal size of the solid phase A in one particle becomes larger so as to lower the plastic limit thereof. For this reason, the solid phase A fractures due to absorption of lithium, and the particle becomes prone to crack.

When W is smaller than 0.001 radian, the plastic limit is so high as to suppress cracking of the particles. Since the boundary between the solid phase A and the solid phase B increases in one particle to cause deterioration in electronic conductivity, an amount to absorb Li decreases.

In the first preferred embodiment of the present invention, the solid phase A comprises Si and the solid phase B comprises a solid solution or an intermetallic compound, which contains Ti and Si.

The use of silicon for the solid phase A can theoretically maximize an amount to absorb Li, allowing a higher capacity. Further, by the use of titanium for the solid phase B, titanium is bonded to lithium to inhibit oxygen as an impurity, which impairs reversibility of lithium, from bonding to silicon.

Moreover, it is particularly preferable that the solid phase B comprises the intermetallic compound of $TiSi_2$. $TiSi_2$ may have a crystal structure including either/both Cmcm or/and Fddd.

It should be noted that, with regard to the diffraction peak of $TiSi_2$ which is attributed to the crystal structure of Cmcm or Fddd as obtained by a wide-angle X-ray diffraction measurement, one whose peak position has shifted to the high angle side or the low angle side is regarded as the diffraction peak of $TiSi_2$ which is attributed to the crystal structure of Cmcm or Fddd.

In the second preferred embodiment, the solid phase A comprises Si and Sn, and the solid phase B comprises a solid solution or an intermetallic compound, which contains Cu and at least one of Sn and Si.

The use of Si and Sn for the solid phase A improves the electronic conductivity of the solid phase A; the use of Cu for the solid phase B improves the electronic conductivity of the solid phase B.

The solid phase B for example may be: $CuSi_2$ and $Cu_6Sn_5$; $CuSi_2$ and a solid solution containing Cu and Sn; $Cu_6Sn_5$ and a solid solution containing Cu and Si; and a solid solution containing Cu and Si and a solid solution containing Cu and Sn.

It is preferable that the aforesaid composite particle is synthesized by the mechanical alloying method.

As another method to prepare the composite particle considered can be a method comprising: quenching and solidifying a melt having a nominal composition of elements each constituting the composite particle, by the dry spraying, wet spraying, roll quenching or rotating electrode method; and then heat-treating the resultant solidified matter at a lower temperature than a solidus temperature of a solid solution or an intermetallic compound, which is determined from the nominal composition.

However, the mechanical alloying method is more effective than the aforesaid method conducted by heat treatment in the respect of facilitating control of the volume ratio of the crystal of the solid phase A and control of the size thereof.

In the mechanical alloying method, a melt having a nominal composition of each element composed of a solid phase A and a solid phase B is quenched and solidified by the dry spraying, wet spraying, rolling quenching or rotating electrode method, to obtain a solidified matter to be used. Further, a powder of each element composed of a solid phase A and a solid phase B may be used as a starting material.

The content of the solid phase A in one particle of the composite particles comprising the solid phase A and the solid phase B is preferably from 10 to 40 wt %, and more preferably from 15 to 35 wt %.

The combination of a negative electrode comprising the aforesaid negative electrode material, a positive electrode capable of bringing a reversible electrochemical reaction of lithium and a non-aqueous electrolyte obtained by dissolving lithium salts in an organic solvent enables production of a non-aqueous electrolyte secondary battery having a high capacity as well as an excellent cycle life characteristic.

The negative electrode can for example be obtained by application of a negative electrode material mixture, comprising the aforesaid negative electrode material, a conductive agent, a binder and the like, on the surface of a current collector.

The conductive agent used for the negative electrode may be any electronically conductive material. For example, graphite such as natural graphite (flake graphite, etc.), artificial graphite and expanded graphite; carbon blacks such as acetylene black, Ketjen black, channel black, furnace black, lamp black and thermal black; conductive fibers such as carbon fiber and metallic fiber, a metallic powder such as a copper powder, and conductive organic materials such as polyphenylene derivatives are preferred, and these materials may be mixed in use. Particularly preferred among them are artificial graphite, acetylene black and carbon fiber.

The amount of the conductive agent to be added is not particularly limited, but it is preferably from 1 to 50 parts by weight, more preferably from 1 to 30 parts by weight, relative to 100 parts by weight of the negative electrode material. Moreover, since the negative electrode material to be used in the present invention has an electronic conductivity, the battery can function without addition of the conductive agent.

As the binder used for the negative electrode, either a thermoplastic resin or a thermosetting resin may be employed. Preferred for example are polyethylene, polypropylene, polytetrafluoroethylene (PTFE), polyvinylidene fluoride (PVDF), styrene butadiene rubber, a tetrafluoroethylene-hexafluoroethylene copolymer, a tetrafluoroethylene-hexafluoropropylene copolymer (FEP), a tetrafluoroethylene-perfluoroalkyl vinyl ether copolymer (PFA), a vinylidene fluoride-hexafluoropropylene copolymer, a vinylidene fluoride-chlorotrifluoroethylene copolymer, an ethylene-tetrafluoroethylene copolymer (ETFE resin), polychlorotrifluoroethylene (PCTFE), a vinylidene fluoride-pentafluoropropylene copolymer, a propylene-tetrafluoroethylene copolymer, an ethylene-chlorotrifluoroethylene copolymer (ECTFE), a vinylidene fluoride-hexafluoropropylene-tetrafluoroethylene copolymer, a vinylidene fluoride-perfluoromethyl vinyl ether-tetrafluoroethylene copolymer, an ethylene-acrylic acid copolymer or an Na$^+$ ion-cross-linked copolymer thereof, an ethylene-methacrylic acid copolymer or an Na$^+$ ion-cross-linked copolymer thereof, an ethylene-methyl acrylate copolymer or an Na$^+$ ion-cross-linked copolymer thereof, and an ethylene-methyl methacrylate copolymer or an Na$^+$ ion-cross-linked copolymer thereof, and these materials may be mixed in use. Particularly preferred among them are styrene butadiene rubber, polyvinylidene fluoride, an ethylene-acrylic acid copolymer or an Na$^+$ ion-cross-linked copolymer thereof, an ethylene-methacrylic acid copolymer or an Na$^+$ ion-cross-linked copolymer thereof, an ethylene-methyl acrylate copolymer or an Na$^+$ ion-cross-linked copolymer thereof, and an ethylene-methyl methacrylate copolymer or an Na$^+$ ion-cross-linked copolymer thereof.

The current collector to be used for the negative electrode may be any electronically conductive material which does not cause a chemical change in a constituted battery. Preferred for example are stainless steel, nickel, copper, titanium, carbon, a conductive resin, and one obtained by treating the surface of copper or stainless steel with carbon, nickel or titanium. Among them particularly preferred are copper and copper alloy. It is preferable that the surface of the current collector is roughened by surface treatment. These materials can also be used after treating the surface thereof with oxidization. The current collector to be used is formed of foil, a film, a sheet, a net, a punched sheet, a lath body, a porous body, a foamed body or fibers. Although the thickness is not particularly limited, a current collector with a thickness of 1 to 500 μm is preferably used.

The positive electrode can for example be obtained by application of a positive electrode mixture, comprising a positive electrode material, a conductive agent, a binder and the like, on the surface of a current collector.

As the positive electrode material, a metallic oxide containing lithium is used. As the examples thereof cited can be $Li_xCoO_2$, $Li_xNO_2$, $Li_xMnO_2$, $Li_xCO_yNi_{1-y}O_2$, $Li_xCO_yM_{1-y}O_2$, $Li_xNi_{1-y}M_yO_z$, $Li_xMn_2O_4$ and $Li_xMn_{2-y}M_yO_4$. It is to be noted that M is one element selected from the group consisting of Na, Mg, Sc, Y, Mn, Fe, Co, Ni, Cu, Zn, Al, Cr, Pb, Sb and B. Further, X, Y and Z satisfy $0 \leq x \leq 1.2$, $0 \leq y \leq 0.9$, and $2.0 \leq z \leq 2.3$, respectively. Moreover, the x value varies with charge/discharge.

As positive electrode materials other than the aforesaid compounds, it is possible to use a transition metal chalcogenide, vanadium oxide and the lithium compound thereof, niobium oxide and the lithium compound thereof, a conjugate polymer comprising an organic conductive material, a Chevrel phase compound, or the like. It is also possible to use a mixture of a plurality of different positive electrode materials. Although the mean particle size of the positive electrode active material particle is not particularly limited, it is preferably from 1 to 30 μm.

The conductive agent used for the positive electrode may be any electronically conductive material which does not cause a chemical change at a charge/discharge potential of the positive electrode material. For example, graphite such as natural graphite (flake graphite, etc.), and artificial graphite; carbon blacks such as acetylene black, Ketjen black, channel black, furnace black, lamp black and thermal black; conductive fibers such as carbon fiber and metallic fiber, fluorinated carbon, metallic powders such as an aluminum powder, conductive whiskers such as zinc oxide whisker and potassium titanate whisker, a conductive metal oxide such as titanium oxide, and conductive organic materials such as polyphenylene derivatives are preferred, and these materials may be mixed in use. Particularly preferred among them are artificial graphite and acetylene black. The amount of the conductive agent to be added is not particularly limited, but it is preferably from 1 to 50 parts by weight, more preferably from 1 to 30 parts by weight, relative to 100 parts by weight of the positive electrode material. In the case of carbon or graphite, in particular, the amount thereof to be added is preferably from 2 to 15 parts by weight per 100 parts by weight of the positive electrode material.

As the binder used for the positive electrode, either a thermoplastic resin or a thermosetting resin may be employed. Preferred for example are polyethylene, polypropylene, polytetrafluoroethylene (PTFE), polyvinylidene fluoride (PVDF), styrene butadiene rubber, a tetrafluoroethylene-hexafluoroethylene copolymer, a tetrafluoroethylene-hexafluoropropylene copolymer (FEP), a tetrafluoroethylene-perfluoroalkyl vinyl ether copolymer (PFA), a vinylidene fluoride-hexafluoropropylene copolymer, a vinylidene fluoride-chlorotrifluoroethylene copolymer, an ethylene-tetrafluoroethylene copolymer (ETFE resin), polychlorotrifluoroethylene (PCTFE), a vinylidene fluoride-pentafluoropropylene copolymer, a propylene-tetrafluoroethylene copolymer, an ethylene-chlorotrifluoroethylene copolymer (ECTFE), a vinylidene fluoride-hexafluoropropylene-tetrafluoroethylene copolymer, a vinylidene fluoride-perfluoromethyl vinyl ether-tetrafluoroethylene copolymer, an ethylene-acrylic acid copolymer or an Na$^+$ ion-cross-linked copolymer thereof, an ethylene-methacrylic acid copolymer or an Na$^+$ ion-cross-linked copolymer thereof, an ethylene-methyl acrylate copolymer or an Na$^+$ ion-cross-linked copolymer thereof, and an ethylene-methyl methacrylate copolymer or an Na$^+$ ion-cross-linked copolymer thereof, and these materials may be mixed in use. Particularly preferred among these materials are polyvinylidene fluoride (PVDF) and polytetrafluoroethylene (PTFE).

The current collector to be used for the positive electrode may be any electronically conductive material which does not cause a chemical change at a charge/discharge potential of the positive electrode material. Preferred for example are stainless steel, aluminum, titanium, carbon, a conductive resin, and one obtained by treating the surface of aluminum or stainless steel with carbon or titanium. Among them particularly preferred are aluminum and aluminum alloy. It is preferable that the surface of the current collector is roughened by surface treatment. These materials can also be used after treating the surface thereof with oxidization. The current collector to be used is formed of foil, a film, a sheet, a net, a punched sheet, a lath body, a porous body, a foamed body, fibers or a non-woven fabric. Although the thickness is not particularly limited, a current collector with a thickness of 1 to 500 μm is preferably used.

The electrode material mixture to be used for the positive electrode and the negative electrode, in addition to the conductive agent and the binder, may be exemplified by a filler, a dispersing agent, an ionic conductor, a pressure reinforcing agent, and other various additives. Any fibrous material which does not cause a chemical change in a constituted battery can be used as the filler. Usually, a fiber made of an olefin polymer like polypropylene or polyethylene, glass or carbon is used. The amount of the filler to be added is not particularly limited, but it is preferably not more than 30 parts by weight relative to 100 parts by weight of the electrode material mixture.

As for the constitution of the positive electrode and the negative electrode, it is preferable that the respective faces of the negative electrode material mixture and the positive electrode material mixture are opposed to one another.

The non-aqueous electrolyte comprises a non-aqueous solvent and a lithium salt dissolved in the solvent.

As the non-aqueous solvent preferred for example are: cyclic carbonates such as ethylene carbonate (EC), propylene carbonate (PC), butylene carbonate (BC) and vinylene carbonate (VC), linear carbonates such as dimethyl carbonate (DMC), diethyl carbonate (DEC), ethyl methyl carbonate (EMC), and dipropyl carbonate (DPC), aliphatic carboxylic acid esters such as methyl formate, methyl acetate, methyl propionate and ethyl propionate, γ-lactones such as γ-butyrolactone, linear ethers such as 1,2-dimethoxyethane (DME),1,2-diethoxyethane (DEE) and ethoxymethoxyethane (EME), cyclic ethers such as tetrahydrofuran and 2-methyl tetrahydrofuran, and aprotic organic solvents such as dimethylsulfoxide, 1,3-dioxolane, formamide, acetamide, dimethylformamide, dioxolane, acetonitrile, propylnitrile, nitromethane, ethyl monoglyme, phosphoric acid triester, trimethoxymethane, dioxolane derivatives, sulfolane, methyl sulfolane, 1,3-dimethyl-2-imidazolidinone, 3-methyl-2-oxazolidinone, propylene carbonate derivatives, tetrahydrofuran derivatives, ethyl ether, 1,3-propanesultone, anisole, dimethyl sulfoxide and N-methylpyrrolidone, and these may be mixed in use. Among them particularly preferred are mixtures of cyclic carbonate and linear carbonate, and mixtures of cyclic carbonate, linear carbonate and aliphatic carboxylic acid ester.

The preferable example of the lithium salt may include $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium lower aliphatic carboxylate, LiCl, LiBr, LiI, chloroboranlithium, lithium tetraphenyl borate, and imide, and these may be mixed in use. Among them, $LiPF_6$ is particularly preferred.

As for the non-aqueous electrolyte, it is preferable that the non-aqueous solvent comprises at least ethylene carbonate and ethyl methyl carbonate while the lithium salt comprises $LiPF_6$. Although the amount of the non-aqueous electrolyte to be added to the battery is not particularly limited, an added amount, as necessary according to the amount of the positive electrode material or the negative electrode material and the size of the battery, can be applied. Although the amount of the lithium salt to be dissolved in the non-aqueous solvent is not particularly limited, it is preferably from 0.2 to 2 mol/l. And the amount to be dissolved is more preferably from 0.5 to 1.5 mol/l.

In place of the aforesaid non-aqueous electrolyte, a solid electrolyte as described below can also be used. Solid electrolytes can be classified into inorganic solid electrolytes and organic solid electrolytes.

As the inorganic solid electrolyte used for example are nitride, halide, oxyacid salt, and the like of Li. In particular, $Li_4SiO_4$, $Li_4SiO_4$—LiI—LiOH, $xLi_3PO_4$-(1-x) $Li_4SiO_4$, $Li_2SiS_3$, $Li_3PO_4$—$Li_2S$—$SiS_2$ and phosphorus sulfide compounds are effectively used.

As the organic solid electrolyte used for example are polymer materials such as polyethylene oxide, polypropylene oxide, polyphosphazene, polyaziridine, polyethylene sulfide, polyvinyl alcohol, polyvinylidene fluoride, polyhexafluoropropylene, and the derivatives, the mixtures and the complexes thereof.

It is further effective, for the purpose of improving the discharge characteristic and the charge/discharge cycle characteristic, that another compound be added into the electrolyte. For example, triethyl phosphate, triethanolamine, cyclic ether, ethylene diamine, n-glyme, pyridine, triamide hexaphosphate, nitrobenzene derivatives, crown ethers, the fourth ammonium salts, ethylene glycol, dialkyl ether, and the like are used.

As the separator, an insulating micro-porous thin film having large ion permeability and prescribed mechanical strength is used. It is preferable that this film has the function of closing pores at a certain temperature or higher so as to increase the resistance. Examples of a separator with hydrophobic properties and resistance to an organic solvent may include a sheet, non-woven fabric and woven fabric, which are made of a glass fiber or an olefin polymer fiber containing at least one selected from the group consisting of polypropylene and polyethylene. The pore size of the separator is preferably within such a range that the electrode material, the binder, the conductive agent and the like, which have separated from the electrode, do not permeate in the separator. The preferable range of the pore size is from 0.01 to 1 μm, for example. The separator normally used is one with a thickness of 10 to 300 μm. Further, although the porosity of the separator is determined according to permeability of electrons and ions, a material and a film thickness, a preferable porosity is normally from 30 to 80%.

It is also possible to constitute a battery in such a manner that a positive electrode material mixture and a negative electrode material mixture contain a polymer material having been made to absorb and retain a non-aqueous electrolyte comprising a solvent and a lithium salt to be dissolved in the solvent, and a porous separator comprising the polymer which has absorbed and retained the non-aqueous electrolyte is integrated with a positive electrode and a negative electrode. The polymer material may be one capable of absorbing and retaining a non-aqueous electrolyte. As the example thereof cited may be a vinylidene fluoride-hexafluoropropylene copolymer.

To the type of the battery applicable is any type such as coin type, button type, sheet type, laminated type, cylindrical type, flat type, rectangular type, and large type for use in electric automobiles and the like.

Furthermore, although the non-aqueous electrolyte secondary battery of the present invention is used for portable information terminals, portable electric appliances, home use compact power storage devices, automatic two-wheeled vehicles, electric automobiles, hybrid electric automobiles and the like, the battery is not particularly limited thereto.

In the following, the present invention is more specifically described by means of examples. However, the present invention is not limited to these examples.

EXAMPLE 1

(i) Production of Negative Electrode Material

In such a manner that a composite particle comprised 20 parts by weight of Sn as a solid phase A and 80 parts by weight of $FeSn_2$ as a solid phase B, a mixed powder of Sn and Fe was melted, and the resultant melt was quenched to be solidified by the roll quenching method. After the obtained solid was introduced into a ball mill container, the container was installed in a planetary ball mill and mechanical alloying was performed with a rotating speed and the time for synthesis set at 2800 rpm and 10 hours, respectively, to obtain a prescribed powder. Subsequently, the obtained powder was classified through a sieve into particles with a particle size of not larger than 45 μm so as to produce a negative electrode material A2.

(ii) Production of Negative Electrode 75 parts by weight of the negative electrode material as thus obtained was mixed with 20 parts by weight of a carbon powder as a conductive agent and 5 parts by weight of a polyvinylidene fluoride resin as a binder. The resultant mixture was dissolved in N-methyl-2-pyrrolidone to give slurry. This was applied on a negative electrode current collector made of copper foil, which was dried and then rolled to obtain a negative electrode.

(iii) Production of Positive Electrode 85 parts by weight of a lithium cobaltate powder as a positive electrode material was mixed with 10 parts by weight of a carbon powder as a conductive agent and 5 parts by weight of a polyvinylidene fluoride resin as a binder. The resultant mixture was dissolved in N-methyl-2-pyrrolidone to give slurry. This was applied on a positive electrode current collector made of aluminum foil, which was dried and then rolled to obtain a positive electrode.

(iv) Assembly of Battery

Figure 1:
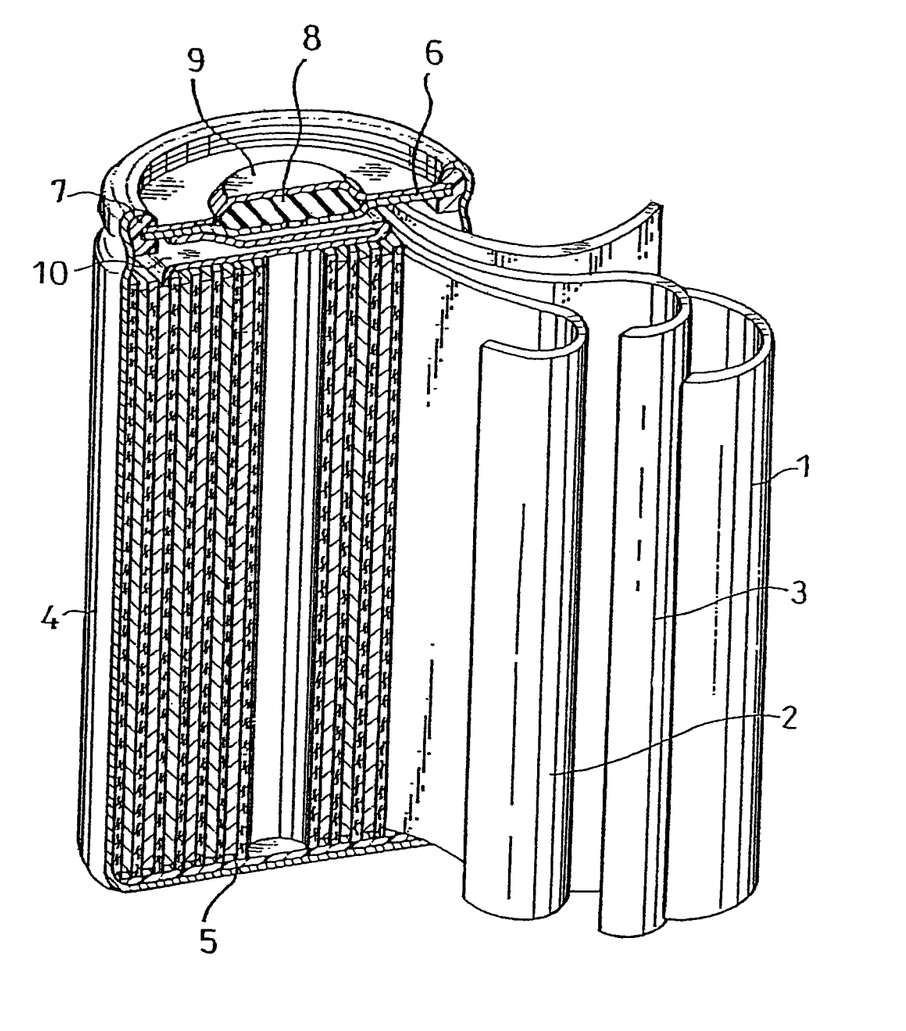
FIG. 1 is a sectional view illustrating a structure of a cylindrical non-aqueous electrolyte secondary battery used in an example.

A vertical sectional view of a cylindrical battery in accordance with the present invention was shown in FIG. 1

A positive electrode 1 and a negative electrode 2 were spirally rolled up with a separator 3 comprising polyethylene arranged therebetween to form an electrode assembly. This electrode assembly was housed in a battery case 4 with a lower insulating plate 5 provided at the bottom thereof. A positive electrode lead plate 10 was then taken out of the positive electrode 1 to be connected to a sealing plate 6 equipped with a positive electrode terminal 9 and a safety valve 8. Subsequently, a non-aqueous electrolyte comprising a mixed solvent of ethylene carbonate and ethyl methyl carbonate in a volume ratio of 1:1 and 1.5 mol/l of $LiPF_6$ dissolved in the mixed solvent was injected into the battery case 4. This battery case 4 was sealed with the sealing plate 6 equipped with a gasket 7 on the periphery thereof to produce a cylindrical battery having a diameter of 18 mm and a height of 650 mm.

EXAMPLE 2

Except that the time for synthesis by mechanical alloying was 15 hours, a negative electrode material A3 was produced on the same conditions as in Example 1. Further, except that the negative electrode material A3 was used in place of the negative electrode material A2, a battery was produced in the same manner as in Example 1.

COMPARATIVE EXAMPLES 1 AND 2

Except that the time for synthesis by mechanical alloying was 3 and 20 hours, the respective negative electrode materials A1 and A4 were produced on the same conditions as in Example 1. Subsequently, except that the negative electrode materials A1 and A4 were used in place of the negative electrode material A2, the respective batteries were produced in the same manner as in Example 1.

EXAMPLES 3 AND 4

Except that a mixed powder of Sn and Fe was used in such a manner that a composite particle comprised 25 parts by weight of Sn as a solid phase A and 75 parts by weight of a solid solution of Fe and Sn as a solid phase B, and that the time for synthesis by mechanical alloying was 10 and 15 hours, the respective negative electrode materials A6 and A7 were produced on the same conditions as in Example 1. Subsequently, except that the negative electrode materials A6 and A7 were used in place of the negative electrode material A2, the respective batteries were produced in the same manner as in Example 1.

COMPARATIVE EXAMPLES 3 AND 4

Except that the time for synthesis by mechanical alloying was 3 and 20 hours, the respective negative electrode materials A5 and A8 were produced in the same conditions as in Example 3. Further, except that the negative electrode materials A5 and A8 were used in place of the negative electrode material A2, the respective batteries were produced in the same manner as in Example 1.

EXAMPLES 5 AND 6

Except that a mixed powder of Si and Co was used in place of the mixed powder of Fe and Sn, in such a manner that a composite particle comprised 15 parts by weight of Si as a solid phase A and 85 parts by weight of $CoSi_2$ as a solid phase B, and that the time for synthesis by mechanical alloying was 10 and 15 hours, the respective negative electrode materials B2 and B3 were produced on the same conditions as in Example 1. Subsequently, except that the negative electrode materials B2 and B3 were used in place of the negative electrode material A2, the respective batteries were produced in the same manner as in Example 1.

COMPARATIVE EXAMPLES 5 AND 6

Except that the time for synthesis by mechanical alloying was 3 and 20 hours, the respective negative electrode materials B1 and B4 were produced in the same conditions as in Example 5. Further, except that the negative electrode materials B1 and B4 were used in place of the negative electrode material A2, the respective batteries were produced in the same manner as in Example 1.

EXAMPLES 7 AND 8

Except that a mixed powder of Si and Co was used in place of the mixed power of Fe and Sn in such a manner that a composite particle comprised 30 parts by weight of Si as a solid phase A and 70 parts by weight of a solid solution of Co and Si as a solid phase B, and that the time for synthesis by mechanical alloying was 10 and 15 hours, the respective negative electrode materials B6 and B7 were produced on the same conditions as in Example 1. Subsequently, except that the negative electrode materials B6 and B7 were used in place of the negative electrode material A2, the respective batteries were produced in the same manner as in Example 1.

COMPARATIVE EXAMPLES 7 AND 8

Except that the time for synthesis by mechanical alloying was 3 AND 20 hours, the respective negative electrode materials B5 and B8 were produced in the same conditions as in Example 7. Further, except that the negative electrode materials B5 and B8 were used in place of the negative electrode material A2, the respective batteries were produced in the same manner as in Example 1.

EXAMPLES 9 AND 10

Except that a mixed powder of Zn and V was used in place of the mixed power of Fe and Sn in such a manner that a composite particle comprised 10 parts by weight of Zn as a solid phase A and 90 parts by weight of $VZn_{16}$ as a solid phase B, and that the time for synthesis by mechanical alloying was 10 and 15 hours, the respective negative electrode materials C2 and C3 were produced on the same conditions as in Example 1. Subsequently, except that the negative electrode materials C2 and C3 were used in place of the negative electrode material A2, the respective batteries were produced in the same manner as in Example 1.

COMPARATIVE EXAMPLES 9 AND 10

Except that the time for synthesis by mechanical alloying was 3 and 20 hours, the respective negative electrode materials C1 and C4 were produced in the same conditions as in Example 9. Further, except that the negative electrode materials C1 and C4 were used in place of the negative electrode material A2, the respective batteries were produced in the same manner as in Example 1.

EXAMPLES 11 AND 12

Except that a mixed powder of Zn and V was used in place of the mixed power of Fe and Sn in such a manner that a composite particle comprised 40 parts by weight of Zn as a solid phase A and 60 parts by weight of a solid solution of Zn and Cu as a solid phase B, and that the time for synthesis by mechanical alloying was 10 and 15 hours, the respective negative electrode materials C6 and C7 were produced on the same conditions as in Example 1. Subsequently, except that the negative electrode materials C6 and C7 were used in place of the negative electrode material A2, the respective batteries were produced in the same manner as in Example 1.

COMPARATIVE EXAMPLES 11 AND 12

Except that the time for synthesis by mechanical alloying was 3 and 20 hours, the respective negative electrode materials C5 and C8 were produced on the same conditions as in Example 11. Further, except that the negative electrode materials C5 and C8 were used in place of the negative electrode material A2, the respective batteries were produced in the same manner as in Example 1.

EXAMPLES 13 AND 14

Except that a mixed powder of Sn and Ti was used in place of the mixed power of Sn and Fe in such a manner that a composite particle comprised 22 parts by weight of Sn as a solid phase A and 78 parts by weight of $Ti_2Sn$ as a solid phase B, and that the time for synthesis by mechanical alloying was 15 and 10 hours, the respective negative electrode materials D2 and D3 were produced on the same conditions as in Example 1. Subsequently, except that the negative electrode materials D2 and D3 were used in place of the negative electrode material A2, the respective batteries were produced in the same manner as in Example 1.

COMPARATIVE EXAMPLES 13 AND 14

Except that the time for synthesis by mechanical alloying was 20 and 3 hours, the respective negative electrode materials D1 and D4 were produced on the same conditions as in Example 13. Further, except that the negative electrode materials D1 and D4 were used in place of the negative electrode material A2, the respective batteries were produced in the same manner as in Example 1.

EXAMPLES 15 AND 16

Except that a mixed powder of Sn and Ti was used in place of the mixed power of Sn and Fe in such a manner that a composite particle comprised 26 parts by weight of Sn as a solid phase A and 74 parts by weight of a solid solution of Ti and Sn as a solid phase B, and that the time for synthesis by mechanical alloying was 15 and 10 hours, the respective negative electrode materials D6 and D7 were produced on the same conditions as in Example 1. Subsequently, except that the negative electrode materials D6 and D7 were used in place of the negative electrode material A2, the respective batteries were produced in the same manner as in Example 1.

COMPARATIVE EXAMPLES 15 AND 16

Except that the time for synthesis by mechanical alloying was 20 and 3 hours, the respective negative electrode materials D5 and D8 were produced on the same conditions as in Example 15. Further, except that the negative electrode materials D5 and D8 were used in place of the negative electrode material A2, the respective batteries were produced in the same manner as in Example 1.

EXAMPLES 17 AND 18

Except that a mixed powder of Si and Ni was used in place of the mixed power of Sn and Fe in such a manner that a composite particle comprised 12 parts by weight of Si as a solid phase A and 88 parts by weight of $NiSi_2$ as a solid phase B, and that the time for synthesis by mechanical alloying was 15 and 10 hours, the respective negative electrode materials E2 and E3 were produced on the same conditions as in Example 1. Subsequently, except that the negative electrode materials E2 and E3 were used in place of the negative electrode material A2, the respective batteries were produced in the same manner as in Example 1.

COMPARATIVE EXAMPLES 17 AND 18

Except that the time for synthesis by mechanical alloying was 20 and 3 hours, the respective negative electrode materials E1 and E4 were produced on the same conditions as in Example 17. Further, except that the negative electrode materials E1 and E4 were used in place of the negative electrode material A2, the respective batteries were produced in the same manner as in Example 1.

EXAMPLES 19 AND 20

Except that a mixed powder of Si and Ni was used in place of the mixed power of Sn and Fe in such a manner that a composite particle comprised 28 parts by weight of Si as a solid phase A and 72 parts by weight of a solid solution of Ni and Si as a solid phase B, and that the time for synthesis by mechanical alloying was 15 and 10 hours, the respective negative electrode materials E6 and E7 were produced on the same conditions as in Example 1. Subsequently, except that the negative electrode materials E6 and E7 were used in place of the negative electrode material A2, the respective batteries were produced in the same manner as in Example 1.

COMPARATIVE EXAMPLES 19 AND 20

Except that the time for synthesis by mechanical alloying was 20 and 3 hours, the respective negative electrode materials E5 and E8 were produced on the same conditions as in Example 19. Further, except that the negative electrode materials E5 and E8 were used in place of the negative electrode material A2, the respective batteries were produced in the same manner as in Example 1.

EXAMPLES 21 AND 22

Except that a mixed powder of Zn and Mg was used in place of the mixed power of Sn and Fe in such a manner that a composite particle comprised 15 parts by weight of Zn as a solid phase A and 85 parts by weight of $Mg_2Zn_{11}$ as a solid phase B, and that the time for synthesis by mechanical alloying was 15 and 10 hours, the respective negative electrode materials F2 and F3 were produced on the same conditions as in Example 1. Subsequently, except that the negative electrode materials F2 and F3 were used in place of the negative electrode material A2, the respective batteries were produced in the same manner as in Example 1.

COMPARATIVE EXAMPLES 21 AND 22

Except that the time for synthesis by mechanical alloying was 20 and 3 hours, the respective negative electrode materials F1 and F4 were produced in the same conditions as in Example 21. Further, except that the negative electrode materials F1 and F4 were used in place of the negative electrode material A2, the respective batteries were produced in the same manner as in Example 1.

EXAMPLES 23 AND 24

Except that a mixed powder of Cd and Zn was used in place of the mixed power of Sn and Fe in such a manner that a composite particle comprised 35 parts by weight of Zn as a solid phase A and 65 parts by weight of a solid solution of Cd and Zn as a solid phase B, and that the time for synthesis by mechanical alloying was 15 and 10 hours, the respective negative electrode materials F6 and F7 were produced on the same conditions as in Example 1. Subsequently, except that the negative electrode materials F6 and F7 were used in place of the negative electrode material A2, the respective batteries were produced in the same manner as in Example 1.

COMPARATIVE EXAMPLES 23 AND 24

Except that the time for synthesis by mechanical alloying was 20 and 3 hours, the respective negative electrode materials F5 and F8 were produced in the same conditions as in Example 23. Further, except that the negative electrode materials F5 and F8 were used in place of the negative electrode material A2, the respective batteries were produced in the same manner as in Example 1.

COMPARATIVE EXAMPLE 25

Except that graphite was used for a negative electrode material in place of the composite particle comprising a solid phase A and a solid phase B in accordance with the present invention, a negative electrode was produced in the same manner as in Example 1. A battery was then produced in the same manner as in Example 1.

EXAMPLE 25

Except that a mixed powder of Si and Co was used in place of the mixed power of Sn and Fe in such a manner that a composite particle comprised 20 parts by weight of Si as a solid phase A and 80 parts by weight of $CoSi_2$ as a solid phase B, a negative electrode material G1 was produced on the same conditions as in Example 1. Subsequently, except that the negative electrode material G1 was used in place of the negative electrode material A2, a battery was produced in the same manner as in Example 1.

EXAMPLE 26

Except that a mixed powder of Si and Ni was used in place of the mixed power of Sn and Fe in such a manner that a composite particle comprised 20 parts by weight of Si as a solid phase A and 80 parts by weight of $NiSi_2$ as a solid phase B, a negative electrode material G2 was produced on the same conditions as in Example 1. Subsequently, except that the negative electrode material G2 was used in place of the negative electrode material A2, a battery was produced in the same manner as in Example 1.

EXAMPLE 27

Except that a mixed powder of Si and W was used in place of the mixed power of Sn and Fe in such a manner that a composite particle comprised 20 parts by weight of Si as a solid phase A and 80 parts by weight of $WSi_2$ as a solid phase B, a negative electrode material G3 was produced on the same conditions as in Example 1. Subsequently, except that the negative electrode material G3 was used in place of the negative electrode material A2, a battery was produced in the same manner as in Example 1.

EXAMPLE 28

Except that a mixed powder of Si and Cu was used in place of the mixed power of Sn and Fe in such a manner that a composite particle comprised 20 parts by weight of Si as a solid phase A and 80 parts by weight of $CuSi_2$ as a solid phase B, a negative electrode material G4 was produced on the same conditions as in Example 1. Subsequently, except that the negative electrode material G4 was used in place of the negative electrode material A2, a battery was produced in the same manner as in Example 1.

EXAMPLE 29

Except that a mixed powder of Ti and Si was used in place of the mixed power of Sn and Fe in such a manner that a composite particle comprised 20 parts by weight of Si as a solid phase A and 80 parts by weight of $TiSi_2$ having the crystal structure of Fddd as a solid phase B, a negative electrode material G5 was produced on the same conditions as in Example 1. Subsequently, except that the negative electrode material G5 was used in place of the negative electrode material A2, a battery was produced in the same manner as in Example 1.

EXAMPLE 30

Except that a mixed powder of Ti and Si was used in place of the mixed power of Sn and Fe in such a manner that a composite particle comprised 20 parts by weight of Si as a solid phase A and 80 parts by weight of $TiSi_2$ having the crystal structure of Cmcm as a solid phase B, a negative electrode material G6 was produced on the same conditions as in Example 1. Subsequently, except that the negative electrode material G6 was used in place of the negative electrode material A2, a battery was produced in the same manner as in Example 1.

EXAMPLE 31

Except that a mixed powder of Ti and Si was used in place of the mixed power of Sn and Fe in such a manner that a composite particle comprised 20 parts by weight of Si as a solid phase A and 80 parts by weight of $TiSi_2$, having the crystal structure of Fddd and Cmcm which are coexistent, as a solid phase B, a negative electrode material G7 was produced on the same conditions as in Example 1. Subsequently, except that the negative electrode material G7 was used in place of the negative electrode material A2, a battery was produced in the same manner as in Example 1.

[Evaluation of Negative Electrode Material and Battery]

(1) Wide-Angle X-Ray Diffraction Measurement

Wide-angle X-ray diffraction measurements of the respective negative electrode materials A1 to A8, B1 to B8, C1 to C8, D1 to D8, E1 to E8, F1 to F8 and G1 to G7 of Examples 1 to 31 and Comparative Examples 1 to 24 were made.

RINT-2500 (manufactured by Rigaku International Corporation) was used in the wide-angel X-ray diffraction measurements with CuKα used as a source of X-rays. Using a measurement method (Hand book on Diffraction of X-rays (Fourth Revised Edition), Rigaku International Corporation, page 42) in which a sample is made to have no orientation, fine particles were filled in a sample holder to be measured. As the sample to be measured, fine particles before production of a negative electrode may be used, or one obtained by collecting an electrode material mixture after production of a negative electrode and then sufficiently separating the particles in a mortar may be used. Further, when diffraction of wide-angle X-rays was measured, a sample surface on which X-rays were incident was made flat. This surface was aligned with a rotation axis of a goniometer so as to prevent occurrence of an error in measuring diffraction angles and intensity. By the wide-angel X-ray diffraction measurement, the maximum diffracted X-ray intensity ($I_A$) attributed to the solid phase A and the maximum diffracted X-ray intensity ($I_B$) attributed to the solid phase B were measured and then the ratio ($I_A/I_B$) of the maximum diffracted X-ray intensities was calculated.

The diffracted X-ray intensity may be represented using either peak intensity which is shown by a profile of a diffraction line obtained by the wide-angel X-ray diffraction measurement, or integrated intensity which is obtained from a profile of a diffraction line or counting data, and there is almost no substantial difference therebetween. Moreover, the profile of the diffraction line at this time may either include or exclude background intensity.

Further, in each of Examples 29 to 31, even when the peak of $TiSi_2$ attributed to the crystal structure of Cmcm or Fddd as obtained by the wide-angle X-ray diffraction measurement was shifted to the high angle side or the low angle side, this was regarded as the peak of the diffraction of $TiSi_2$, attributed to the crystal structure of Cmcm or Fddd.

(2) Charge/Discharge Cycle Test

A charge/discharge cycle test was conducted on the respective batteries using the negative electrode materials A1 to A8, B1 to B8, C1 to C8, D1 to D8, E1 to E8, F1 to F8 and G1 to G7 of Examples 1 to 31 and Comparative Examples 1 to 24, and graphite of Comparative Example 25.

In a charge/discharge cycle, it is repeated to charge a battery at a constant current of 1000 mA until a voltage reached 4.2 V and to discharge the battery at a constant current of 1000 mA until the voltage dropped to 2.0 V in a constant temperature container at 20° C. This charge/discharge cycle was repeated 100 times and a capacity maintenance ratio at the 100th cycle was measured. It is to be noted that the capacity maintenance ratio was represented by a relative value of a discharge capacity at the 100th cycle to an initial discharge capacity which was assumed as 100.

Table 1 showed $I_A/I_B$ values obtained by the wide-angle X-ray diffraction measurements of the respective negative electrode materials of Examples 1 to 12 and Comparative Examples of 1 to 12, and the initial capacities as well as capacity maintenance ratios of the respective batteries using, for the negative electrodes thereof, the aforesaid negative electrode materials and graphite of Comparative Example 25.

TABLE 1

| Negative electrode material | Solid phase A | Solid phase B | $I_A/I_B$ | Initial discharge capacity (mAh) | Capacity maintenance ratio (%) |
|---|---|---|---|---|---|
| A1 | Sn | $FeSn_2$ | 0.2 | 2200 | 50 |
| A2 | Sn | $FeSn_2$ | 0.1 | 2255 | 90 |
| A3 | Sn | $FeSn_2$ | 0.001 | 2240 | 91 |
| A4 | Sn | $FeSn_2$ | 0.0005 | 1600 | 75 |
| A5 | Sn | Fe, Sn Solid solution | 0.3 | 2295 | 45 |
| A6 | Sn | Fe, Sn Solid solution | 0.1 | 2230 | 91 |
| A7 | Sn | Fe, Sn Solid solution | 0.001 | 2210 | 92 |
| A8 | Sn | Fe, Sn Solid solution | 0.0005 | 1580 | 78 |
| B1 | Si | $CoSi_2$ | 0.2 | 2300 | 51 |
| B2 | Si | $CoSi_2$ | 0.1 | 2355 | 91 |
| B3 | Si | $CoSi_2$ | 0.001 | 2340 | 90 |
| B4 | Si | $CoSi_2$ | 0.0005 | 1600 | 76 |
| B5 | Si | Si, Co Solid solution | 0.3 | 2395 | 46 |
| B6 | Si | Si, Co Solid solution | 0.1 | 2330 | 92 |
| B7 | Si | Si, Co Solid solution | 0.001 | 2310 | 91 |
| B8 | Si | Si, Co Solid solution | 0.0005 | 1580 | 78 |
| C1 | Zn | $VZn_{16}$ | 0.2 | 2100 | 51 |
| C2 | Zn | $VZn_{16}$ | 0.1 | 2155 | 91 |
| C3 | Zn | $VZn_{16}$ | 0.001 | 2140 | 90 |
| C4 | Zn | $VZn_{16}$ | 0.0005 | 1600 | 76 |
| C5 | Zn | Zn, Cu Solid solution | 0.3 | 2195 | 46 |
| C6 | Zn | Zn, Cu Solid solution | 0.1 | 2130 | 90 |
| C7 | Zn | Zn, Cu Solid solution | 0.001 | 2110 | 91 |
| C8 | Zn | Zn, Cu Solid solution | 0.0005 | 1580 | 78 |
| Graphite | — | — | — | 1800 | 89 |

As for the negative electrode materials A1 to A8, in both the case of the negative electrode materials A1 to A4 with the solid phase B comprising the intermetallic compound $FeSn_2$ and the case of the negative electrode materials A5 to A8 with the solid phase B comprising a solid solution of Fe and Sn, when $I_A/I_B$ was not less than 0.001, the discharge capacity was not lower than 2200 mAh, which was higher than that in Comparative Example 25 where graphite was used as the negative electrode material. Further, when $I_A/I_B$ was in the range of $0.001 \leq I_A/I_B \leq 0.1$, the capacity maintenance ratio was not lower than 90%, which was higher than that in Comparative Example 25 where graphite was used as the negative electrode material. It was therefore possible to obtain a high capacity as well as a high capacity maintenance ratio when $I_A/I_B$ was in the range represented by $0.001 \leq I_A/I_B \leq 0.1$, as in the case of using the negative electrode materials A2, A3, A6 and A7 in Examples 1 to 4.

As for the negative electrode materials B1 to B8, in both the case of the negative electrode materials B1 to B4 with the solid phase B comprising the intermetallic compound $CoSi_2$ and the case of the negative electrode materials B5 to B8 with the solid phase B comprising a solid solution of Si and Co, when $I_A/I_B$ was not less than 0.001, the discharge capacity was not lower than 2300 mAh, which was higher than that in Comparative Example 25 where graphite was used as the negative electrode material. Further, when $I_A/I_B$ was in the range of $0.001 \leq I_A/I_B \leq 0.1$, the capacity maintenance ratio was not lower than 90%, which was higher than that in Comparative Example 25 where graphite was used as the negative electrode material. It was therefore possible to obtain a high capacity as well as a high capacity maintenance ratio when $I_A/I_B$ was in the range represented by $0.001 \leq I_A/I_B \leq 0.1$, as in the case of using the negative electrode materials B2, B3, B6 and B7 in Examples 5 to 8.

As for the negative electrode materials C1 to C8, in both the case of the negative electrode materials C1 to C4 with the solid phase B comprising the intermetallic compound $VZn_{16}$ and the case of the negative electrode materials C5 to C8 with the solid phase B comprising a solid solution of Zn and Cu, when $I_A/I_B$ was not less than 0.001, the discharge capacity was not lower than 2100 mAh, which was higher than that in Comparative Example 25 where graphite was used as the negative electrode material. Further, when $I_A/I_B$ was in the range of $0.001 \leq I_A/I_B \leq 0.1$, the capacity maintenance ratio was not lower than 90%, which was higher than that in Comparative Example 25 where graphite was used as the negative electrode material. It was therefore possible to obtain a high capacity as well as a high capacity maintenance ratio when $I_A/I_B$ was in the range represented by $0.001 \leq I_A/I_B \leq 0.1$, as in the case of using the negative electrode materials C2, C3, C6 and C7 in Examples 9 to 12.

Table 2 showed W values obtained by the wide-angle X-ray diffraction measurements of the respective negative electrode materials of Examples 13 to 24 and Comparative Examples 13 to 24, and initial capacities as well as capacities maintenance ratios of the respective batteries using negative electrode plates comprising these negative electrode materials and graphite of Comparative Example 25.

TABLE 2

| Negative electrode material | Solid phase A | Solid phase B | W (rad) | Initial discharge capacity (mAh) | Capacity maintenance ratio (%) |
|---|---|---|---|---|---|
| D1 | Sn | $Ti_2Sn$ | 0.2 | 2200 | 50 |
| D2 | Sn | $Ti_2Sn$ | 0.1 | 2255 | 90 |
| D3 | Sn | $Ti_2Sn$ | 0.001 | 2240 | 91 |
| D4 | Sn | $Ti_2Sn$ | 0.0005 | 1600 | 75 |
| D5 | Sn | Ti, Sn Solid solution | 0.3 | 2295 | 45 |
| D6 | Sn | Ti, Sn Solid solution | 0.1 | 2230 | 91 |
| D7 | Sn | Ti, Sn Solid solution | 0.001 | 2210 | 92 |
| D8 | Sn | Ti, Sn Solid solution | 0.0005 | 1580 | 73 |
| E1 | Si | $NiSi_2$ | 0.2 | 2300 | 51 |
| E2 | Si | $NiSi_2$ | 0.1 | 2355 | 91 |
| E3 | Si | $NiSi_2$ | 0.001 | 2340 | 90 |
| E4 | Si | $NiSi_2$ | 0.0005 | 1600 | 75 |
| E5 | Si | Si, Ni Solid solution | 0.3 | 2395 | 46 |
| E6 | Si | Si, Ni Solid solution | 0.1 | 2330 | 90 |
| E7 | Si | Si, Ni Solid solution | 0.001 | 2310 | 91 |
| E8 | Si | Si, Ni Solid solution | 0.0005 | 1580 | 72 |
| F1 | Zn | $Mg_2Zn_{11}$ | 0.2 | 2300 | 50 |
| F2 | Zn | $Mg_2Zn_{11}$ | 0.1 | 2355 | 90 |
| F3 | Zn | $Mg_2Zn_{11}$ | 0.001 | 2340 | 90 |
| F4 | Zn | $Mg_2Zn_{11}$ | 0.0005 | 1600 | 69 |
| F5 | Zn | Zn, Cd Solid solution | 0.3 | 2395 | 47 |
| F6 | Zn | Zn, Cd Solid solution | 0.1 | 2330 | 91 |
| F7 | Zn | Zn, Cd Solid solution | 0.001 | 2310 | 92 |
| F8 | Zn | Zn, Cd Solid solution | 0.0005 | 1580 | 63 |
| Graphite | — | — | — | 1800 | 89 |

As for the negative electrode materials D1 to D8, in both the case of the negative electrode materials D1 to D4 with the solid phase B comprising the intermetallic compound $Ti_2Sn$ and the case of the negative electrode materials D5 to D8 with the solid phase B comprising a solid solution of Ti and Sn, when W was not smaller than 0.001 radian, the discharge capacity was not lower than 2200 mAh, which was higher than that in Comparative Example 25 where graphite was used as the negative electrode material. Further, when W (radian) was in the range represented by $0.001 \leq W \leq 0.1$, the capacity maintenance ratio was not lower than 90%, which was higher than that in Comparative Example 25 where graphite was used as the negative electrode material. It was therefore possible to obtain a high capacity as well as a high capacity maintenance ratio when W (radian) was in the range represented by $0.001 \leq W \leq 0.1$, as in the case of using the negative electrode materials D2, D3, D6 and D7 in Examples 13 to 16.

As for the negative electrode materials E1 to E8, in both the case of the negative electrode materials E1 to E4 with the solid phase B comprising the intermetallic compound $NiSi_2$ and the case of the negative electrode materials E5 to E8 with the solid phase B comprising a solid solution of Si and Ni, when W was not smaller than 0.001 radian, the discharge capacity was not lower than 2300 mAh, which was higher than that in Comparative Example 25 where graphite was used as the negative electrode material. Further, when W (radian) was in the range represented by $0.001 \leq W \leq 0.1$, the capacity maintenance ratio was not lower than 90%, which was higher than that in Comparative Example 25 where graphite was used as the negative electrode material. It was therefore possible to obtain a high capacity as well as a high capacity maintenance ratio when W (radian) was in the range represented by $0.001 \leq W \leq 0.1$, as in the case of using the negative electrode materials E2, E3, E6 and E7 in Examples 17 to 20.

As for the negative electrode materials F1 to F8, in both the case of the negative electrode materials F1 to F4 with the solid phase B comprising the intermetallic compound $Mg_2Zn_{11}$ and the case of the negative electrode materials F5 to F8 with the solid phase B comprising a solid solution of Zn and Cd, when W was not smaller than 0.001 radian, the discharge capacity was not lower than 2100 mAh, which was higher than that in Comparative Example 25 where graphite was used as the negative electrode material. Further, when W (radian) was in the range represented by $0.001 \leq W \leq 0.1$, the capacity maintenance ratio was not lower than 90%, which was higher than that in Comparative Example 25 where graphite was used as the negative electrode material. It was therefore possible to obtain a high capacity as well as a high capacity maintenance ratio when W (radian) was in the range represented by $0.001 \leq W \leq 0.1$, as in the case of using the negative electrode materials F2, F3, F6 and F7 in Examples 21 to 24.

Table 3 showed the $I_A/I_B$ values and W values, obtained by the wide-angle X-ray diffraction measurements of the respective electrode materials of Examples 25 to 31, and initial capacities as well as capacities maintenance ratios of the respective batteries using, for the negative electrodes thereof, the aforesaid negative electrode materials and graphite of Comparative Example 25.

high as not lower than 2500 mAh while the capacity maintenance ratio was as high as 92%.

Revealed therefore was that, in order to obtain a higher capacity as well as a higher capacity maintenance ratio, it is preferable to use a negative electrode material which comprises a solid phase A comprising Si, and a solid phase B comprising Ti and Si, and $TiSi_2$ having a crystal structure of at least one selected from the group consisting of Cmcm and Fddd.

EXAMPLES 32 AND 33

Except that a mixed powder of $CuSi_2$, $Cu_6Sn_5$, Si and Sn was used in place of the mixed power of Sn and Fe in such a manner that a composite particle comprised 20 parts by weight of Si and Sn (mole ratio 1:2) as a solid phase A and 80 parts by weight of $CuSi_2$ and $Cu_6Sn_5$ (mole ratio 1:6) as a solid phase B, and that the time for synthesis by mechanical alloying was 14 and 12 hours, the respective negative electrode materials I2 and I3 were produced in the same conditions as in Example 1. Subsequently, except that the negative electrode materials I2 and I3 were used in place of the negative electrode material A2, the respective batteries were produced in the same manner as in Example 1.

COMPARATIVE EXAMPLES 26 AND 27

Except that the time for synthesis by mechanical alloying was 15 and 11 hours, the respective negative electrode materials I1 and I4 were produced in the same conditions as in Example 32. Further, except that the negative electrode materials I1 and I4 were used in place of the negative electrode material A2, the respective batteries were produced in the same manner as in Example 1.

EXAMPLES 34 AND 35

Except that a mixed powder of a solid solution of Cu and Si, a solid solution of Cu and Sn, Si and Sn was used in place of the mixed power of Sn and Fe in such a manner that a composite particle comprised 20 parts by weight of Si and Sn

TABLE 3

| Negative electrode material | Solid phase A | Solid phase B | $I_A/I_B$ | W (rad) | Initial discharge capacity (mAh) | Capacity maintenance ratio (%) |
|---|---|---|---|---|---|---|
| G1 | Si | $CoSi_2$ | 0.08 | 0.02 | 2350 | 90 |
| G2 | Si | $NiSi_2$ | 0.05 | 0.01 | 2355 | 91 |
| G3 | Si | $WSi_2$ | 0.08 | 0.03 | 2340 | 90 |
| G4 | Si | $CuSi_2$ | 0.05 | 0.02 | 2315 | 91 |
| G5 | Si | $TiSi_2$ (Fddd) | 0.08 | 0.05 | 2500 | 92 |
| G6 | Si | $TiSi_2$ (Cmcm) | 0.08 | 0.05 | 2510 | 92 |
| G7 | Si | $TiSi_2$ (Cmcm/Fddd coexist) | 0.08 | 0.05 | 2505 | 92 |
| Graphite | — | — | — | — | 1800 | 89 |

In any of the respective batteries using, for the negative electrodes thereof, the materials G1 to G7 with the solid phase A comprising Si, the solid phase B comprising various intermetallic compounds as shown in Table 3, $I_A/I_B$ being in the range represented by $0.001 \leq I_A/I_B \leq 0.1$ and W (radian) being in the range represented by $0.001 \leq W \leq 0.1$, the discharge capacity was not lower than 2300 mAh and the capacity maintenance ratio was not lower than 90%. Especially in the case of using the materials G5 to G7 where the solid phase B comprised $TiSi_2$ having a crystal structure of Cmcm, Fddd, or mixed-state Cmcm and Fddd, the discharge capacity was as (mole ratio 1:2) as a solid phase A and 80 parts by weight of a solid solution of Cu and Si and a solid solution of Cu and Sn (mole ratio 1:6) as a solid phase B, and that the time for synthesis by mechanical alloying was 14 and 12 hours, the respective negative electrode materials I6 and I7 were produced on the same conditions as in Example 1. Subsequently, except that the negative electrode materials I6 and I7 were used in place of the negative electrode material A2, the respective batteries were produced in the same manner as in Example 1.

COMPARATIVE EXAMPLES 28 AND 29

Except that the time for synthesis by mechanical alloying was 15 and 11 hours, the respective negative electrode materials I5 and I8 were produced in the same conditions as in Example 34. Further, except that the negative electrode materials I5 and I8 were used in place of the negative electrode material A2, the respective batteries were produced in the same manner as in Example 1.

EXAMPLES 36 AND 37

Except that a mixed powder of $CuSi_2$, a solid solution of Cu and Sn, Si and Sn was used in place of the mixed power of Sn and Fe in such a manner that a composite particle comprised 20 parts by weight of Si and Sn (mole ratio 1:2) as a solid phase A and 80 parts by weight of $CuSi_2$ and a solid solution of Cu and Sn (mole ratio 1:6) as a solid phase B, and that the time for synthesis by mechanical alloying was 14 and 12 hours, the respective negative electrode materials I10 and I11 were produced on the same conditions as in Example 1. Subsequently, except that the negative electrode materials I10 and I11 were used in place of the negative electrode material A2, the respective batteries were produced in the same manner as in Example 1.

COMPARATIVE EXAMPLES 30 AND 31

Except that the time for synthesis by mechanical alloying was 15 and 11 hours, the respective negative electrode materials I9 and I12 were produced in the same conditions as in Example 36. Further, except that the negative electrode materials I9 and I12 were used in place of the negative electrode material A2, the respective batteries were produced in the same manner as in Example 1.

EXAMPLES 38 AND 39

Except that a mixed powder of $Cu_6Sn_5$, a solid solution of Cu and Si, Si and Sn was used in place of the mixed power of Sn and Fe in such a manner that a composite particle comprised 20 parts by weight of Si and Sn (mole ratio 1:2) as a solid phase A and 80 parts by weight of $Cu_6Sn_5$ and a solid solution of Cu and Si (mole ratio 1:6) as a solid phase B, and that the time for synthesis by mechanical alloying was 14 and 12 hours, the respective negative electrode materials I14 and I15 were produced on the same conditions as in Example 1. Subsequently, except that the negative electrode materials I14 and I15 were used in place of the negative electrode material A2, the respective batteries were produced in the same manner as in Example 1.

COMPARATIVE EXAMPLES 32 AND 33

Except that the time for synthesis by mechanical alloying was 15 and 11 hours, the respective negative electrode materials I13 and I16 were produced in the same conditions as in Example 38. Further, except that the negative electrode materials I13 and I16 were used in place of the negative electrode material A2, the respective batteries were produced in the same manner as in Example 1.

It is to be noted that the solid solution of Cu and Si or the solid solution of Cu and Sn, used in each of Examples 34 to 39 and Comparative Examples 28 to 33 above, was one with an atomic ratio of Cu:Si or Cu:Sn of 99:1.

Wide-angle X-ray diffraction measurements of the aforesaid respective negative electrode materials I1 to I16 of Examples 32 to 39 and Comparative Examples 26 to 33 were made in the same manner as in Example 1, to obtain W values.

Further, except that the negative electrode materials I1 to I16 were used in place of the negative electrode material A2, the respective batteries were produced in the same manner as in Example 1. These batteries were subjected to the charge/discharge cycle test in the same manner as in Example 1.

The evaluation results of these batteries were shown in Table 4.

TABLE 4

| Negative electrode material | Solid phase A | Solid phase B | W (rad) | Initial discharge capacity (mAh) | Capacity maintenance ratio (%) |
| --- | --- | --- | --- | --- | --- |
| I1 | Si, Sn | $CuSi_2$, $Cu_6Sn_5$ | 0.2 | 2280 | 53 |
| I2 | Si, Sn | $CuSi_2$, $Cu_6Sn_5$ | 0.1 | 2290 | 91 |
| I3 | Si, Sn | $CuSi_2$, $Cu_6Sn_5$ | 0.001 | 2230 | 90 |
| I4 | Si, Sn | $CuSi_2$, $Cu_6Sn_5$ | 0.0005 | 2310 | 73 |
| I5 | Si, Sn | Cu & Si S/S, Cu & Sn S/S | 0.2 | 2279 | 53 |
| I6 | Si, Sn | Cu & Si S/S, Cu & Sn S/S | 0.1 | 2289 | 91 |
| I7 | Si, Sn | Cu & Si S/S, Cu & Sn S/S | 0.001 | 2229 | 90 |
| I8 | Si, Sn | Cu & Si S/S, Cu & Sn S/S | 0.0005 | 2309 | 73 |
| I9 | Si, Sn | $CuSi_2$, Cu & Sn S/S | 0.2 | 2281 | 53 |
| I10 | Si, Sn | $CuSi_2$, Cu & Sn S/S | 0.1 | 2291 | 91 |
| I11 | Si, Sn | $CuSi_2$, Cu & Sn S/S | 0.001 | 2231 | 90 |
| I12 | Si, Sn | $CuSi_2$, Cu & Sn S/S | 0.0005 | 2311 | 73 |
| I13 | Si, Sn | Cu & Si S/S, $Cu_6Sn_5$ | 0.2 | 2282 | 53 |
| I14 | Si, Sn | Cu & Si S/S, $Cu_6Sn_5$ | 0.1 | 2292 | 91 |
| I15 | Si, Sn | Cu & Si S/S, $Cu_6Sn_5$ | 0.001 | 2232 | 90 |
| I16 | Si, Sn | Cu & Si S/S, $Cu_6Sn_5$ | 0.0005 | 2312 | 73 |

S/S: Solid solution

It was revealed that each of the capacity maintenance ratios was dependent on the W value while all the initial discharge capacities were not lower than 2200 mAh, as indicated in Table 4. More specifically, it was found that when the W value was $0.001 \leq W \leq 0.1$, the capacity maintenance ratio was a favorable value of about 90 to 91%.

As thus described, a high capacity and a high capacity maintenance ratio were obtained with a composite particle used as the negative electrode material, including a solid phase A comprising Si and Sn, a solid phase B comprising a solid solution or an intermetallic compound, which contained Cu, Si and Sn, and a W value satisfied $0.001 \leq W \leq 0.1$.

EXAMPLES 40 AND 41

Except that a mixed powder of $CuSi_2$, $Cu_6Sn_5$, Si and Sn was used in place of the mixed power of Sn and Fe in such a manner that a composite particle comprised 20 parts by weight of Si and Sn (mole ratio 1:3) as a solid phase A and 80 parts by weight of $CuSi_2$ and $Cu_6Sn_5$ (mole ratio 1:6) as a solid phase B, and that the time for synthesis by mechanical alloying was 14 and 12 hours, the respective negative electrode materials I18 and I19 were produced on the same conditions as in Example 1. Subsequently, except that the negative electrode materials I18 and I19 were used in place of the negative electrode material A2, the respective batteries were produced in the same manner as in Example 1.

COMPARATIVE EXAMPLES 34 AND 35

Except that the time for synthesis by mechanical alloying was 15 and 11 hours, the respective negative electrode materials I17 and I20 were produced in the same conditions as in Example 40. Further, except that the negative electrode materials I17 and I20 were used in place of the negative electrode material A2, the respective batteries were produced in the same manner as in Example 1.

EXAMPLES 42 AND 43

Except that a mixed powder of a solid solution of Cu and Si, a solid solution of Cu and Sn, Si and Sn was used in place of the mixed power of Sn and Fe in such a manner that a composite particle comprised 20 parts by weight of Si and Sn (mole ratio 1:3) as a solid phase A and 80 parts by weight of a solid solution of Cu and Si and a solid solution of Cu and Sn (mole ratio 1:6) as a solid phase B, and that the time for synthesis by mechanical alloying was 14 and 12 hours, the respective negative electrode materials I22 and I23 were produced on the same conditions as in Example 1. Subsequently, except that the negative electrode materials I22 and I23 were used in place of the negative electrode material A2, the respective batteries were produced in the same manner as in Example 1.

COMPARATIVE EXAMPLES 36 AND 37

Except that the time for synthesis by mechanical alloying was 15 and 11 hours, the respective negative electrode materials I21 and I24 were produced in the same conditions as in Example 42. Further, except that the negative electrode materials I21 and I24 were used in place of the negative electrode material A2, the respective batteries were produced in the same manner as in Example 1.

EXAMPLES 44 AND 45

Except that a mixed powder of $CuSi_2$, a solid solution of Cu and Sn, Si and Sn was used in place of the mixed power of Sn and Fe in such a manner that a composite particle comprised 20 parts by weight of Si and Sn (mole ratio 1:3) as a solid phase A and 80 parts by weight of $CuSi_2$ and a solid solution of Cu and Sn (mole ratio 1:6), the time for synthesis by mechanical alloying was 14 and 12 hours, the respective negative electrode materials I26 and I27 were produced on the same conditions as in Example 1. Subsequently, except that the negative electrode materials I26 and I27 were used in place of the negative electrode material A2, the respective batteries were produced in the same manner as in Example 1.

COMPARATIVE EXAMPLES 38 AND 39

Except that the time for synthesis by mechanical alloying was 15 and 11 hours, the respective negative electrode materials I25 and I28 were produced in the same conditions as in Example 44. Further, except that the negative electrode materials I25 and I28 were used in place of the negative electrode material A2, the respective batteries were produced in the same manner as in Example 1.

EXAMPLES 46 AND 47

Except that a mixed powder of $Cu_6Sn_5$, a solid solution of Cu and Si, Si and Sn was used in place of the mixed power of Sn and Fe in such a manner that a composite particle comprised 20 parts by weight of Si and Sn (mole ratio 1:3) as a solid phase A and 80 parts by weight of a solid solution of Cu and Si, and $Cu_6Sn_5$ (mole ratio 1:6), and that the time for synthesis by mechanical alloying was 14 and 12 hours, the respective negative electrode materials I30 and I31 were produced on the same conditions as in Example 1. Subsequently, except that the negative electrode materials I30 and I31 were used in place of the negative electrode material A2, the respective batteries were produced in the same manner as in Example 1.

COMPARATIVE EXAMPLES 40 AND 41

Except that the time for synthesis by mechanical alloying was 15 and 11 hours, the respective negative electrode materials I29 and I32 were produced in the same conditions as in Example 46. Further, except that the negative electrode materials I29 and I32 were used in place of the negative electrode material A2, the respective batteries were produced in the same manner as in Example 1.

It is to be noted that the solid solution of Cu and Si or the solid solution of Cu and Sn, used in each of Examples 42 to 47 and Comparative Examples 36 to 41 above, was one with an atomic ratio of Cu:Si or Cu:Sn of 99:1.

The wide-angle X-ray diffraction measurements of the aforesaid respective negative electrode materials I17 to 32 of Examples 40 to 47 and Comparative Examples 34 to 41 were made in the same manner as in Example 1, to obtain $I_A/I_B$ values.

Further, except that the negative electrode materials I17 to I32 were used in place of the negative electrode material A2, the respective batteries were produced in the same manner as in Example 1. These batteries were subjected to the charge/discharge cycle test in the same manner as in Example 1.

The evaluation results of these batteries were shown in Table 5.

TABLE 5

| Negative electrode material | Solid phase A | Solid phase B | $I_A/I_B$ | Initial discharge capacity (mAh) | Capacity maintenance ratio (%) |
|---|---|---|---|---|---|
| I17 | Si, Sn | $CuSi_2$, $Cu_6Sn_5$ | 0.0008 | 2240 | 52 |
| I18 | Si, Sn | $CuSi_2$, $Cu_6Sn_5$ | 0.001 | 2250 | 91 |
| I19 | Si, Sn | $CuSi_2$, $Cu_6Sn_5$ | 0.1 | 2210 | 90 |
| I20 | Si, Sn | $CuSi_2$, $Cu_6Sn_5$ | 0.3 | 2286 | 72 |

TABLE 5-continued

| Negative electrode material | Solid phase A | Solid phase B | $I_A/I_B$ | Initial discharge capacity (mAh) | Capacity maintenance ratio (%) |
|---|---|---|---|---|---|
| I21 | Si, Sn | Cu & Si S/S, Cu & Sn S/S | 0.0008 | 2255 | 51 |
| I22 | Si, Sn | Cu & Si S/S, Cu & Sn S/S | 0.001 | 2288 | 91 |
| I23 | Si, Sn | Cu & Si S/S, Cu & Sn S/S | 0.1 | 2231 | 90 |
| I24 | Si, Sn | Cu & Si S/S, Cu & Sn S/S | 0.3 | 2299 | 70 |
| I25 | Si, Sn | CuSi$_2$, Cu & Sn S/S | 0.0008 | 2279 | 50 |
| I26 | Si, Sn | CuSi$_2$, Cu & Sn S/S | 0.001 | 2288 | 91 |
| I27 | Si, Sn | CuSi$_2$, Cu & Sn S/S | 0.1 | 2223 | 90 |
| I28 | Si, Sn | CuSi$_2$, Cu & Sn S/S | 0.3 | 2302 | 74 |
| I29 | Si, Sn | Cu & Si S/S, Cu$_6$Sn$_5$ | 0.0008 | 2262 | 54 |
| I30 | Si, Sn | Cu & Si S/S, Cu$_6$Sn$_5$ | 0.001 | 2282 | 91 |
| I31 | Si, Sn | Cu & Si S/S, Cu$_6$Sn$_5$ | 0.1 | 2233 | 90 |
| I32 | Si, Sn | Cu & Si S/S, Cu$_6$Sn$_5$ | 0.3 | 2305 | 71 |

S/S: Solid solution

It was revealed that each of the capacity maintenance ratios was dependent on the $I_A/I_B$ value while all the initial discharge capacities were not lower than 2200 mAh, as indicated in Table 5. More specifically, it was found that when the $I_A/I_B$ value was $0.001 \leq I_A/I_B \leq 0.1$, the capacity maintenance ratio was a favorable value of about 90 to 91%.

As thus described, a high capacity and a high capacity maintenance ratio were obtained with a composite particle used as the negative electrode material, including a solid phase A comprising Si and Sn, a solid phase B comprising a solid solution or an intermetallic compound, which contained Cu, Si and Sn, and an $I_A/I_B$ value satisfied $0.001 \leq I_A/I_B \leq 0.1$.

EXAMPLES 48 to 55 and Comparative Examples 42 AND 43

Except that a mixed powder of Ti and Si was used in place of the mixed power of Sn and Fe in such a manner that a composite particle comprised 20 parts by weight of Si as a solid phase A and 80 parts by weight of TiSi$_2$ as a solid phase B, and that the time for synthesis by mechanical alloying was as shown in Table 6, the respective negative electrode materials H2 to H9 of Examples 48 to 55 and the respective negative electrode materials H1 and H10 of Comparative Examples 42 and 43 were produced on the same conditions as in Example 1.

Wide-angle X-ray diffraction measurements of the aforesaid respective negative electrode materials H1 to H10 were made in the same manner as in Example 1, to obtain W values.

Further, except that the negative electrode materials H1 to H10 were used in place of the negative electrode material A2, the respective batteries were produced in the same manner as in Example 1. These batteries were subjected to the charge/discharge cycle test in the same manner as in Example 1.

The evaluation results of these batteries were shown in Table 6.

TABLE 6

| Negative electrode material | Solid phase A | Solid phase B | Synthesis time (hr) | W (rad) | Initial discharge capacity (mAh) | Capacity maintenance ratio (%) |
|---|---|---|---|---|---|---|
| H1 | Si | TiSi$_2$ | 10.1 | 0.0008 | 2519 | 65 |
| H2 | Si | TiSi$_2$ | 10.5 | 0.001 | 2521 | 90 |
| H3 | Si | TiSi$_2$ | 11.0 | 0.005 | 2520 | 92 |
| H4 | Si | TiSi$_2$ | 11.5 | 0.008 | 2530 | 93 |
| H5 | Si | TiSi$_2$ | 12.0 | 0.01 | 2525 | 93 |
| H6 | Si | TiSi$_2$ | 12.5 | 0.02 | 2535 | 93 |
| H7 | Si | TiSi$_2$ | 13.0 | 0.04 | 2532 | 93 |
| H8 | Si | TiSi$_2$ | 13.5 | 0.06 | 2528 | 92 |
| H9 | Si | TiSi$_2$ | 14.0 | 0.1 | 2522 | 90 |
| H10 | Si | TiSi$_2$ | 14.5 | 0.2 | 2518 | 60 |

A high capacity and a high capacity maintenance ratio were obtained with a composite particle used as the negative electrode material, including a solid phase A comprising Si, a solid phase B comprising TiSi$_2$, and the W value satisfying $0.001 \leq W \leq 0.1$. It was also found that a composite particle whose W value satisfying $0.008 \leq W \leq 0.04$ was particularly preferred since the capacity maintenance ratio then became as high as 93%.

It should be noted that there can be obtained a similar effect when the solid phase B in the negative electrode material of the present invention comprises, as the other element than the constituent element of the solid phase A, an element selected from the elements of Group 2, transition, Group 12 and Group 13 and the Group 14 element excluding carbon, which are different from the elements used in the present examples.

Further, there is no particular limitation on the nominal ratio of the constituent elements in the negative electrode material; the negative electrode material may comprise two phases in such a state that the one phase (solid phase A) which is mainly composed of Sn, Si and Zn is dispersed in the other phase (solid phase B), and this does not particularly limit the nominal composition.

Moreover, the solid phase A may comprise, in addition to Sn, Si or Zn, a small amount of an element selected from O, C, N, S, Ca, Mg, Al, Fe, W, V, Ti, Cu, Cr, Co and P, for example.

The solid phase B may comprise, in addition to the solid solution or the intermetallic compound as indicated in the present examples, a small amount of an element selected from O, C, N, S, Ca, Mg, Al, Fe, W, V, Ti, Cu, Cr, Co and P, for example.

Industrial Applicability

As thus described, according to the present invention, it is possible to provide a negative electrode material capable of suppressing pulverization thereof due to repeated cycles. It is also possible by the use of this negative electrode material to provide a non-aqueous electrolyte secondary battery with a high capacity and an excellent cycle life characteristic.

The invention claimed is:

1. A negative electrode material for non-aqueous electrolyte secondary batteries, which is configured for absorbing and desorbing lithium, wherein:
    said negative electrode material comprises a composite particle including solid phases A and B, said solid phase A being dispersed in said solid phase B,
    said solid phase A comprises at least one element selected from the group consisting of silicon, tin and zinc,
    said solid phase B comprises a solid solution or an intermetallic compound, which contains: the constituent element of said solid phase A; and at least one element selected from the group consisting of the elements of Group 2, transition, Group 12, Group 13 and Group 14 which are listed in Long Form of Periodic Table, except for the constituent element of said solid phase A and carbon, and
    a ratio $(I_A/I_B)$ of the maximum diffracted X-ray intensity $(I_A)$ attributed to said solid phase A to the maximum diffracted X-ray intensity $(I_B)$ attributed to said solid phase B satisfies $0.001 \leq I_A/I_B \leq 0.1$, in terms of a diffraction line obtained by a wide-angle X-ray diffraction measurement of said composite particle.

2. A non-aqueous electrolyte secondary battery comprising a positive electrode configured for a reversible electrochemical reaction of lithium, a non-aqueous electrolyte comprising an organic solvent and a lithium salt dissolved in said organic solvent, and a negative electrode comprising the negative electrode material in accordance with claim 1.

3. The negative electrode material for non-aqueous electrolyte secondary batteries in accordance with claim 1, wherein said solid phase A comprises Si and said solid phase B comprises a solid solution or an intermetallic compound, which contains Ti and Si.

4. The negative electrode material for non-aqueous electrolyte secondary batteries in accordance with claim 3, wherein said solid phase B comprises $TiSi_2$ having a crystal structure of at least one selected from the group consisting of Cmcm and Fddd.

* * * * *